US011516798B2

(12) United States Patent
Veillette

(10) Patent No.: US 11,516,798 B2
(45) Date of Patent: Nov. 29, 2022

(54) METHOD AND SYSTEM FOR COMMUNICATING USING A DEFAULT CHANNEL DURING UNUSED PERIODS OF TIMESLOTS

(71) Applicant: Trilliant Networks, Inc., Cary, NC (US)

(72) Inventor: Michel Veillette, Waterloo (CA)

(73) Assignee: Trilliant Networks, Inc., Cary, NC (US)

( * ) Notice: Subject to any disclaimer, the term of this patent is extended or adjusted under 35 U.S.C. 154(b) by 85 days.

(21) Appl. No.: 17/077,011

(22) Filed: Oct. 22, 2020

(65) Prior Publication Data
US 2021/0219286 A1 Jul. 15, 2021

Related U.S. Application Data

(60) Provisional application No. 62/959,351, filed on Jan. 10, 2020.

(51) Int. Cl.
*H04W 28/08* (2009.01)
*H04W 72/04* (2009.01)
*H04W 74/08* (2009.01)

(52) U.S. Cl.
CPC ... *H04W 72/0446* (2013.01); *H04W 28/0846* (2020.05); *H04W 74/0808* (2013.01)

(58) Field of Classification Search
CPC .......... H04J 3/1694; H04J 2203/0069; H04W 28/0846; H04W 56/001; H04W 72/0446; H04W 72/048; H04W 72/0493; H04W 74/0808
See application file for complete search history.

(56) References Cited

U.S. PATENT DOCUMENTS

| | | | | |
|---|---|---|---|---|
| 7,308,005 B1* | 12/2007 | Roggendorf | ......... | H04W 28/06 370/347 |
| 7,912,002 B2* | 3/2011 | Gaur | ..................... | H04W 72/02 370/328 |
| 8,351,390 B2* | 1/2013 | Gaur | ..................... | H04W 72/02 370/328 |
| 8,576,811 B2* | 11/2013 | Belcea | .................... | H04L 45/26 455/518 |
| 8,805,273 B2* | 8/2014 | Panpaliya | ......... | H04W 36/0072 455/507 |
| 9,736,855 B2* | 8/2017 | Zhou | ..................... | H04W 74/04 |

(Continued)

OTHER PUBLICATIONS

Xue Wang et al., Advanced Technologies in Ad Hoc and Sensor Networks, in: Proceedings of the 7th China Conference on Wireless Sensor Networks, ISBN: 978-3-642-54174-2, Jul. 2014, [retrieved on Jan. 13, 2021], Retrieved from the internet: <URL: https://www.springer.com/gp/book/9783642541735> pp. 148-149.

(Continued)

*Primary Examiner* — Alpus Hsu
(74) *Attorney, Agent, or Firm* — Moser Taboada

(57) ABSTRACT

A method for utilizing a default channel during unused periods of timeslots to join, communicate, and/or synchronize with a network comprising determining a time slot is idle; in response to determining the time slot is idle tuning to a default channel while the timeslot is idle; receiving a message on the default channel; and optionally transmitting a subsequent message on the same channel.

18 Claims, 6 Drawing Sheets

(56) References Cited

U.S. PATENT DOCUMENTS

| | | | |
|---|---|---|---|
| 9,854,607 B1* | 12/2017 | Chu | H04W 74/002 |
| 10,602,528 B2* | 3/2020 | Gan | H04L 5/006 |
| 2007/0174510 A1 | 7/2007 | Hata et al. | |
| 2008/0069036 A1* | 3/2008 | Lee | H04W 74/0816 |
| | | | 455/67.11 |
| 2009/0023466 A1 | 1/2009 | Sutivong et al. | |
| 2015/0078357 A1 | 3/2015 | L'Heureux et al. | |
| 2016/0212695 A1 | 7/2016 | Lynch et al. | |
| 2016/0278088 A1* | 9/2016 | Cheng | H04W 28/18 |
| 2016/0316489 A1* | 10/2016 | Kuo | H04W 48/16 |
| 2017/0156144 A1* | 6/2017 | Shudark | H04W 56/001 |
| 2017/0181178 A1* | 6/2017 | Gokturk | H04W 56/001 |
| 2017/0238233 A1* | 8/2017 | Oh | H04W 74/0808 |
| | | | 370/328 |
| 2018/0027597 A1* | 1/2018 | Ahn | H04W 74/0875 |
| | | | 370/445 |
| 2018/0103443 A1* | 4/2018 | Prakash | H04B 1/713 |
| 2018/0115996 A1* | 4/2018 | Si | H04W 74/0808 |
| 2018/0234965 A1* | 8/2018 | Ahn | H04W 72/0413 |
| 2019/0239138 A1* | 8/2019 | Oh | H04W 16/14 |
| 2019/0335479 A1* | 10/2019 | Thubert | H04W 40/24 |
| 2019/0363976 A1 | 11/2019 | Thubert et al. | |
| 2020/0022183 A1* | 1/2020 | Bhorkar | H04L 5/001 |
| 2020/0236677 A1* | 7/2020 | Cui | H04W 24/02 |
| 2021/0045024 A1* | 2/2021 | Hett | H04W 72/0446 |

OTHER PUBLICATIONS

Hideaki Takagi et al., Explicit Probability Density Function for the Length of a Busy Period in an M/M/1/K Queue, Advances in Queueing Theory and Network Applications, e-ISBN: 978-0-387-09703-9, Oct. 1, 2014, [retrieved on Jan. 13, 2021], Retrieved from the internet: <URL: https://www.researchgate.net/publication/251161442> p. 231.

James Brown et al., Estimating packet reception rate in noisy environments, In: 39th Annual IEEE Conference on Local Computer Networks Workshops, e-ISBN: 978-1-4799-3784-4, Oct. 20, 2014, [retrieved on Jan. 13, 2021], Retrieved from the internet: <URL: https://ieeexplore.ieee.org/document/6927706> section 3.

PCT International Search Report and the Written Opinion of the International Searching Authority, PCT/US2020/056783, dated Jan. 29, 2021, 11 pgs.

* cited by examiner

METHOD AND SYSTEM FOR COMMUNICATING USING A DEFAULT CHANNEL DURING UNUSED PERIODS OF TIMESLOTS

CROSS-REFERENCE TO RELATED APPLICATIONS

This application claims priority to U.S. Provisional Patent Application Ser. No. 62/959,351 filed Jan. 10, 2020, which is incorporated by reference herein in its entirety.

BACKGROUND OF THE INVENTION

Field of the Invention

Embodiments of the present invention generally relate to communicating with unsynchronized nodes and more specifically, to a method and system for utilizing a default channel in a time slotted, channel hopping system to communicate during unused periods of timeslots.

Description of the Related Art

Multichannel networks may use Time Slotted Channel Hopping (TSCH) Medium Access Control (MAC). The wireless network may consist of radio nodes (i.e., nodes) that connect directly, dynamically, and non-hierarchically to other nodes and cooperate with one another to efficiently route data through the network. Nodes implementing the Time Slotted Channel Hopping (TSCH) Medium Access Control (MAC) layer are periodically switching channels (i.e., hopping). TSCH nodes are assigned timeslots and channels on which to receive and transmit data. For two proximate TSCH nodes to communicate, one node has to be configured to transmit on a selected timeslot and channel and the other node has to be configured to listen on the same timeslot and channel. Before joining a network and starting to exchange messages with other proximate nodes, the joining node must receive a first message (e.g., a beacon) containing the configuration of the TSCH MAC from a transmitting node within the network. This beacon is also used to synchronize the clock of the joining node with the TSCH network time.

Currently, a joining node may passively discover a network by waiting for a beacon transmitted from a node in the network. Due to the limited number of timeslots available to each node, beacons are transmitted relatively infrequently and are typically transmitted pseudo randomly on all or a subset of channels. This implies that the joining node listening on a specific channel may wait a significant amount of time before receiving a beacon from a node proximate to it. This passive discovery also implies that the joining node must know at least one channel within a channel list used by the network.

Alternatively, a joining node may actively attempt to discover a TSCH network by periodically broadcasting requests to trigger the transmission of a beacon. Each request has a small likelihood to be received by a proximate node; however, when the timing between requests is carefully selected, one of these requests is inevitably received. The drawback of this method is the amount of interference generated by these requests and the amount of time and energy expended by the joining node.

As such, whether passively or actively attempting to join with the network, the waiting time required for a node to receive the beacon and join the network may be considerable, sometimes several minutes.

Therefore, there is a need for a method and system for utilizing a default channel in a time slotted, channel hopping system to communicate during unused periods of timeslots.

SUMMARY

A system and/or method is provided for utilizing a default channel in a time slotted channel hopping system during unused periods of timeslots to receive messages from unsynchronized nodes as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
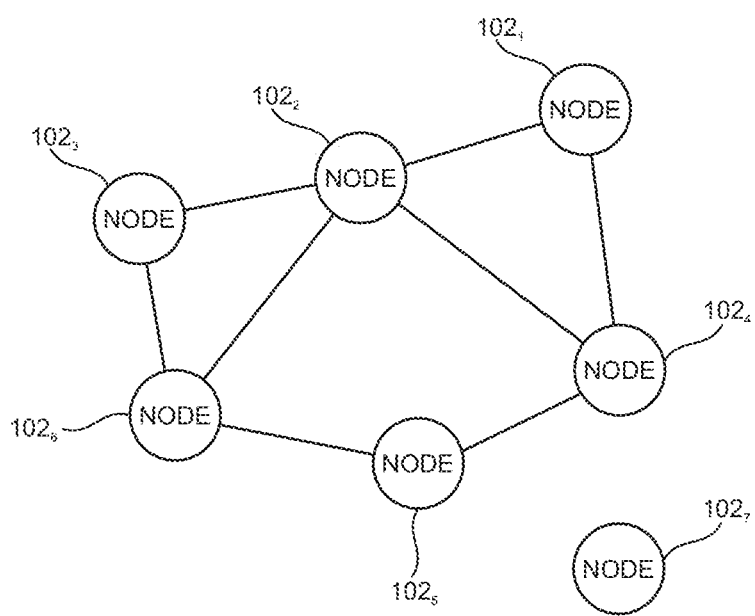
FIG. 1 depicts a diagram of an exemplary mesh network implementing a default channel during unused periods of timeslots to join, communicate, and/or synchronize with the network according to one or more embodiments of the invention.

While the method and system are described herein by way of example for several embodiments and illustrative drawings, those skilled in the art will recognize that the method and system for utilizing a default channel during unused periods of timeslots to synchronize with a network is not limited to the embodiments or drawings described. It should be understood that the drawings and detailed description thereto are not intended to limit embodiments to the particular form disclosed. Rather, the intention is to cover all modifications, equivalents and alternatives falling within the spirit and scope of the method and system for utilizing a default channel during unused periods of timeslots to synchronize with a network as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Although the word "node" is used herein, those skilled in the art will appreciate that the disclosed invention may be implemented on any network device.

DETAILED DESCRIPTION OF EMBODIMENTS

Embodiments of the invention provide a system and method for utilizing a default channel in a TSCH network during unused periods of timeslots to synchronize with a network, according to one or more embodiments. Nodes in a network are often idle. For example, any timeslot that is not assigned for reception (RX) or for transmission (TX) is idle, any timeslot assigned for transmission (TX) when there are no messages available in the transmission buffer for the node is idle, the remaining time of a timeslot assigned for reception (RX) when no incoming frame is detected within a wait time for a timeslot is idle, or the remaining time of a timeslot assigned as shared (SH) when there are no messages ready for transmission on the timeslot and when no incoming frame is detected within wait time for the timeslot is idle. When a timeslot is idle during any of the idle times just described, the node on a TSCH network implementing this method may tune to a well-known default channel for reception of communication with nodes not connected to the network. In practice, a node may be tuned to the default channel more than ninety-eight percent (98%) of the time. As such, when a node or other device outside of the network wishes to join, communicate, and/or synchronize with the network, the device simply sends out a message, such as a request for a beacon, to the default channel and receives a response within a short timeframe.

Advantageously, the present invention may be used to make network discovery and synchronization much more time efficient. For example, when a node is attempting to join a network, the present invention significantly reduces the number of requests transmitted and the time required to perform an active discovery. In addition, the joining node does not need to be aware of the channel list of a targeted TSCH network. It merely needs to be provisioned with the well-known default channel. The present invention reduces the time required by a battery-powered device to join or re-synchronize with its network, thereby reducing drain of the battery. The present invention reduces the time required by a field service person's handheld device to initiate a local communication with a TCSH node, thereby reducing the time a service technician wastes waiting to establish a connection with a local node. The present invention reduces the time required for a node with restored power to rejoin the network and transmit a power restoration notification during a power restoration event. The timely reporting of power restoration improves the utilities ability to efficiently manage its resources. The present invention may be used to quickly discover neighbor TSCH networks during normal operation of the TSCH MAC, that may be used to trigger a network roaming activity to automatically distribute the load between TSCH networks.

Various embodiments of a system and method for utilizing a default channel during unused periods of timeslots to synchronize with a network are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on digital signals stored within a memory of a specific apparatus or special purpose computing device or platform. In the context of this specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device can manipulate or transforming signals, typically represented as physical electronic or magnetic quantities within memories, registers, or other information storage devices, transmission devices, or display devices of the special purpose computer or similar special purpose electronic computing device.

FIG. 1 is a graphical depiction of a network 100 comprising TSCH connected nodes $102_1$, $102_2$, $102_3$, $102_4$, $102_5$, $102_6$ (collectively referred to as connected nodes 102) and a node $102_7$ that is not yet joined and/or synchronized with the network, according to one or more embodiments of the invention. The connected nodes 102 are interconnected to each other such that multiple paths exist between each node 102. An exemplary network that may utilize and benefit from the present invention is a wireless mesh network. Those skilled in the art can realize from the following disclosure that other network topologies, both wired and wireless, may find benefit by using the present invention. The present invention is a method and system for utilizing a default channel during unused periods of timeslots receive messages from a node $102_7$ not synchronized with network 100. At each timeslot, each connected node 102 has channel offset assigned for receiving (RX), transmitting (TX), or shared (RX or TX), or not assigned to either. Each node determines when the timeslot is idle and tunes to a default channel to listen for devices that wish to send information or synchronize with the network 100. In the present example, node $102_7$ wishes to join the network. The node $102_7$ is configured to know the default channel it should use to communicate with the network. Node $102_7$ may send a request for a beacon on the default channel. A number of nodes may be listening on the default channel for the request. An idle connected node 102 that is proximate to $102_7$ hears the request, transmits the beacon on the same default channel so node $102_7$ can receive it, thereby providing node $102_7$ the information needed to synchronize with the network 100.

Figure 2:
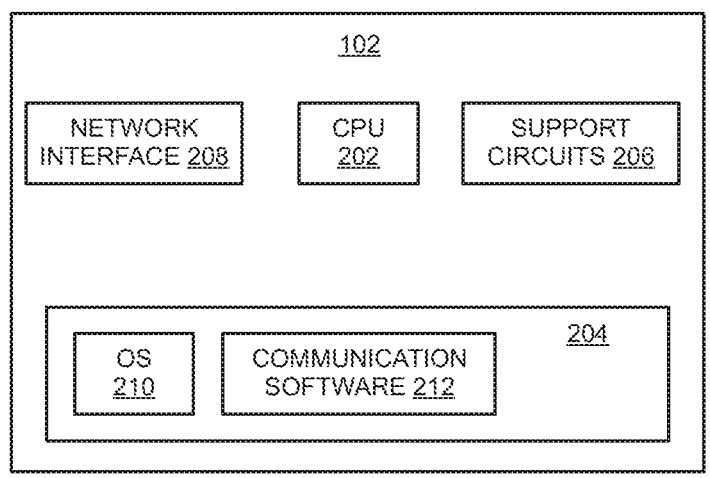
FIG. 2 depicts a block diagram of an exemplary network node for use within a routed network implementing a default channel during unused periods of timeslots, according to one or more embodiments of the invention.

FIG. 2 is a block diagram 200 of a node 102. The node 102 may be a one or more individual Internet of Things (IoT) devices, such as meters, sensors, streetlights, and the like that may benefit from connection to a computer or communications network.

The node 102 comprises a CPU 202, support circuits 206, memory 204 and a network interface 208. The CPU 202 may comprise one or more readily available microprocessors or microcontrollers. The support circuits 206 are well known circuits that are used to support the operation of the CPU and may comprise one or more of cache, power supplies, input/output circuits, network interface cards, clock circuits, and the like. Memory 204 may comprise random access memory, read only memory, removable disk memory, flash memory, optical memory or various combinations of these types of memory. The memory 204 is sometimes referred to as main memory and may, in part, be used as cache memory or buffer memory. The memory 204 stores various forms of software and files, such as, an operating system (OS) 210, communication software 212. The operating system 210 may be one of several well-known operating systems or real time operating systems such as FreeRTOS, Contiki, LINUX, WINDOWS, and the like.

The network interface 208 connects the node 102 to the network 100. The network interface 208 may facilitate a wired or wireless connection to other nodes. In some embodiments, for example when node 102 is a border router, node 102 may have multiple interfaces 208 for routing within the network 100 as well as to connect to another network.

Figure 3A:
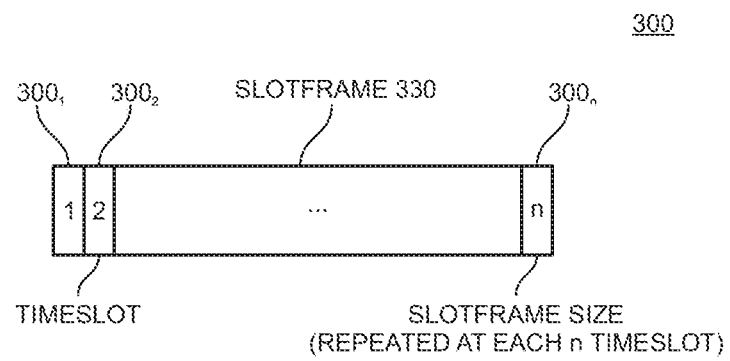
FIGS. 3A-3E depict possible slot frame and timeslots in a time-slotted channel hopping (TSCH) network, according to one or more embodiments of the invention.
Figure 3B:
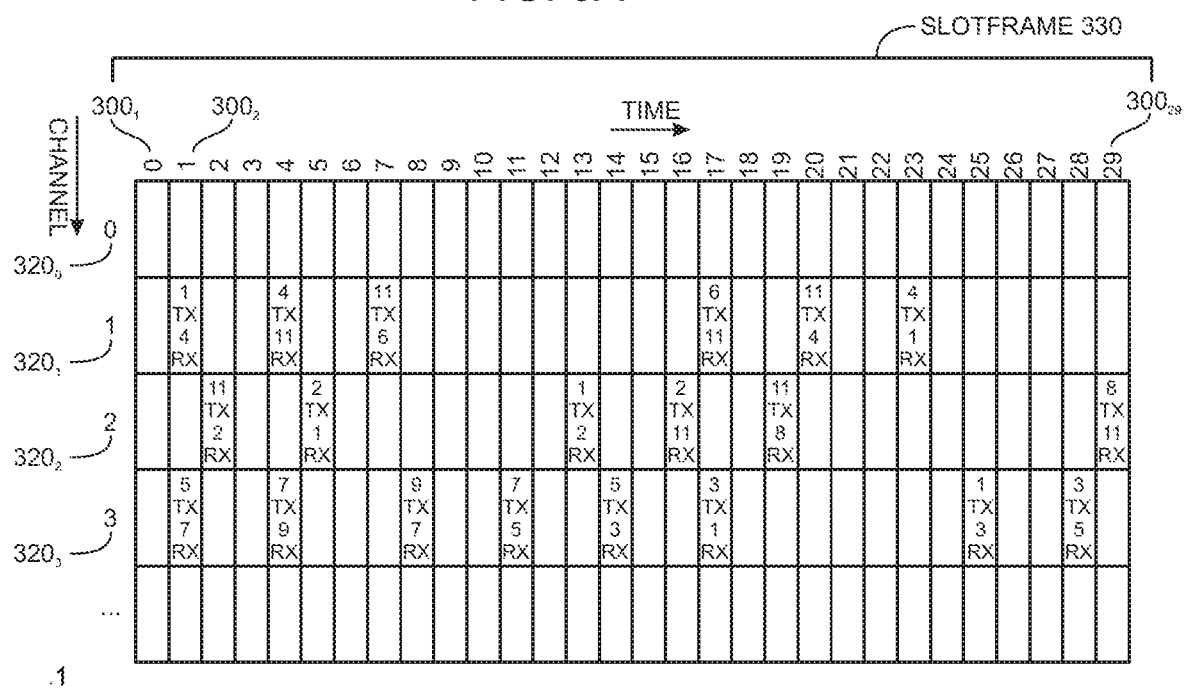

FIGS. 3A and 3B depict a possible slot frame and timeslots in a time-slotted channel hopping (TSCH) network, according to one or more embodiments of the invention. In FIG. 3A, time is sliced up into timeslots $300_1$, $300_2$, . . . $300_n$ (collectively referred to as timeslot 300). Each timeslot 300 is long enough for a Physical data unit (PDU) of maximum size to be sent from a first node to second node and an acknowledgement to be received back. Timeslots 300 are grouped into slot frame 330. Multiple slot frames may be defined within a node to create a TSCH schedule. A TSCH schedule instructs each node what to do in each timeslot 300: transmit and/or receive, or stay idle.

FIG. 3B depicts an exemplary collective schedule. The schedule indicates, for each scheduled (transmit or receive) timeslot, a channel offset $320_1$, $320_2$, $320_n$ (collectively referred to as channel offset 320). and the address of the neighbor node with which to communicate. Once a node obtains its schedule, the node executes the schedule. For each transmit timeslot, the node checks whether there is a message in the outgoing buffer that matches the neighbor written in the schedule information for that timeslot. If there is none, the node implementing the invention tunes to the default channel for the duration of the timeslot. For each receive timeslot, the node listens for possible incoming messages. If none is received after some listening period within the timeslot, the node tunes to the default channel for the remaining duration of the timeslot. While tuned to the default channel, if a node receives a request to broadcast a beacon with synchronization and configuration information of the TSCH MAC, the node schedules a beacon broadcast on the default channel.

Not all nodes 102 in network 100 are required to implement the invention. For example, battery operated devices may not have the energy to listen on the default channel during idle timeslots.

Figure 3C:
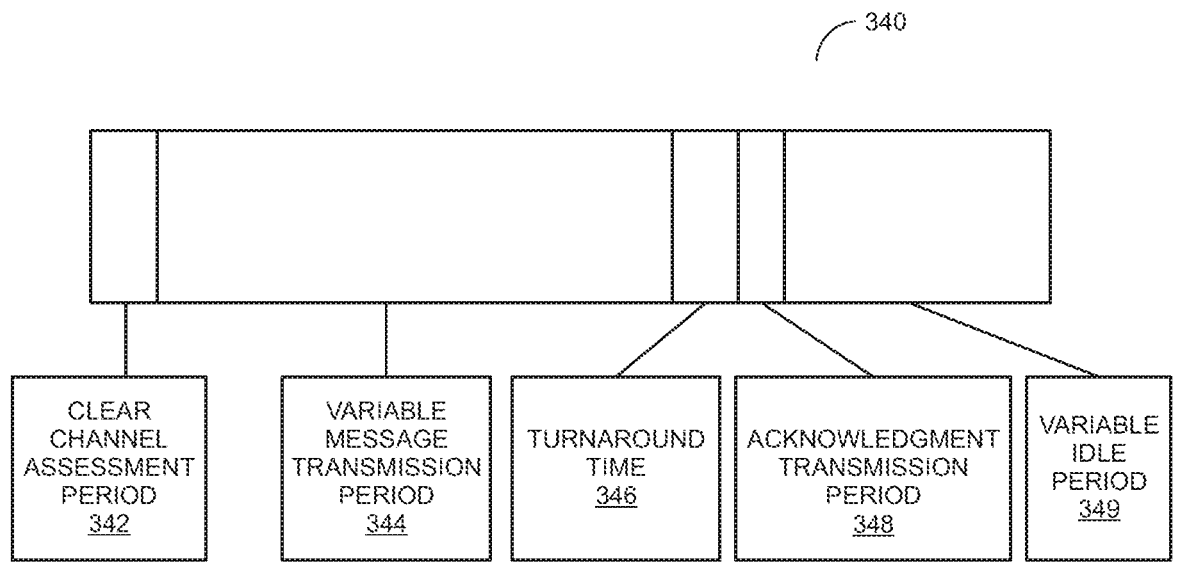
Figure 3D:
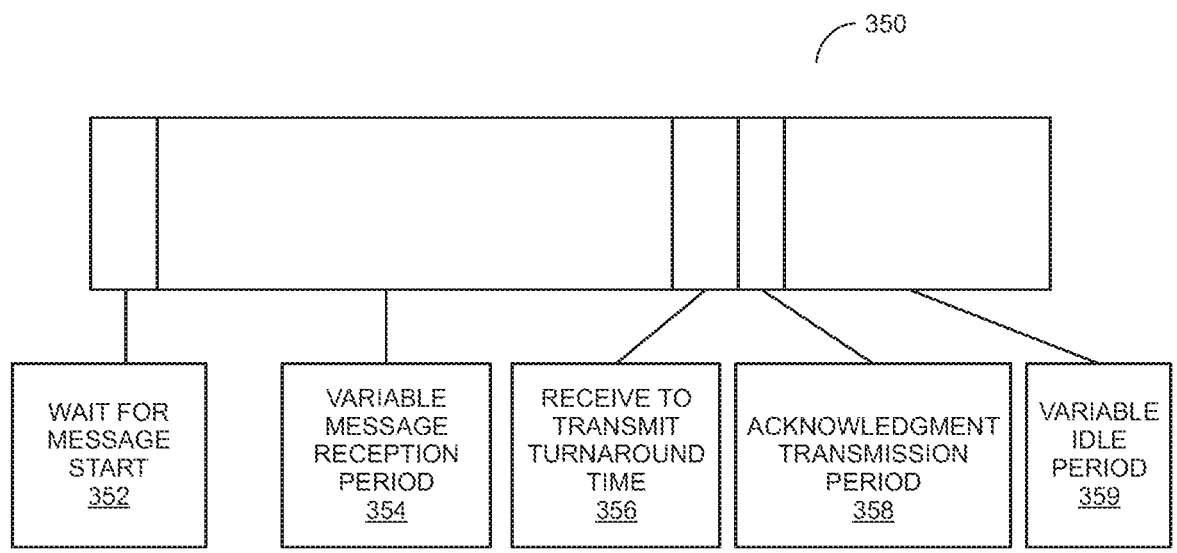

FIGS. 3C and 3D depict examples of a scheduled transmit timeslot 340 and a scheduled receive timeslot 350.

The scheduled timeslot 350 start off with a Clear Channel Assessment (CCA) period 342. CCA determines if the transmission channel is already in use or not. There is no transmission if that channel is occupied. It the network does not use a CCA, this period is not present. In the case that the CCA determines that the channel is occupied, then the node treats the remainder of the timeslot as idle and it can tune to the default channel and listen.

If the channel is free and the node has a message to transmit, it does so in the variable message transmission period 344. The size of the period varies with the size of the message to be transmitted. If there is no message to be transmitted, the rest of the timeslot period is idle and the node may listen on the default channel.

After transmitting a message, the node must switch from transmit mode to receive mode and wait for an acknowledgement in period 346.

The acknowledgement of the message from the receiver is received in the Acknowledgement transmission period 348. This period is either fixed or variable depending on the networking protocol.

After the acknowledgment is received the transmitting node is finished with the time slot and any idle time 349 that is left in the timeslot is available for tuning to the default channel and listening. The timeslot period is usually designed to accommodate a CCA 342, maximum sized packet 344, a transmit to receive turnaround time 346 and a maximum sized acknowledgement 348. When all the constituent periods are at the maximum, then there is no idle period 349. There will be a minimum useful idle period that is determined by the time it takes to change the node from the scheduled channel to the default channel. Idle periods less that the channel change time cannot be used for listening.

The scheduled receive timeslot 350 is designed to be compatible with the scheduled transmit timeslot 340. The wait period for message start 352 is set to be longer than the sum of the CCA period 342, inter-node clock inaccuracies and any inter-node time-of-flight propagation time. The receiving node should detect a scheduled transmission within the wait period 352. If it does not, then the remained of the timeslot is idle and the node can change to the default channel and listen. If a start of message is detected, the receiving node will examine it and determine if it accepts the message. The complete message is received in the variable period 354. Depending on the receiver's implementation the node may decide that the message is not for it early on in the period 354, in which case the node can end the reception and the rest of the timeslot will be idle and available for listening on the default channel. After the message is received and accepted the node must switch from reception to transmission 356. The acknowledgement is then transmitted in period 358. Any remaining time in the timeslot is the idle period 359. It the idle period is large enough to accommodate the time it takes to change to the default channel, then the idle period may be used to listen.

Figure 3E:
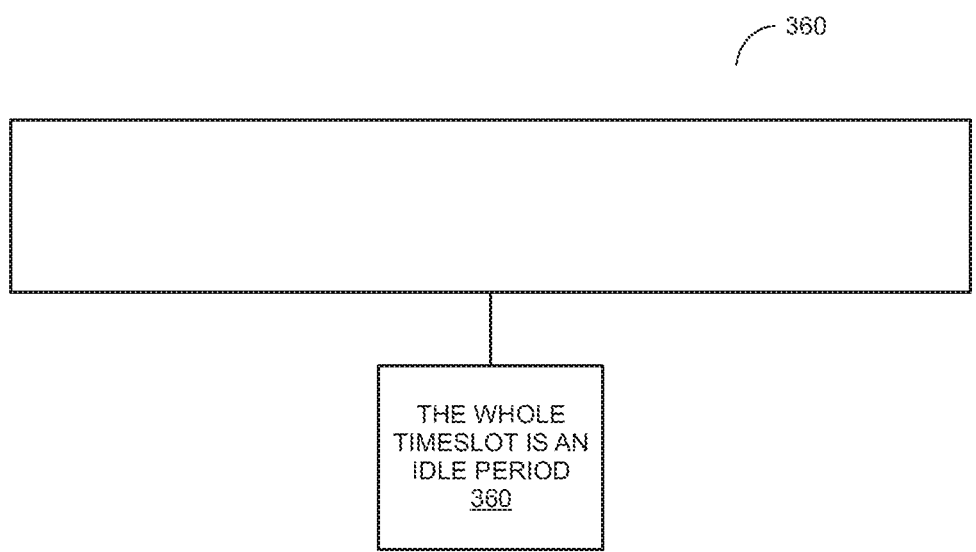

FIG. 3E depicts the timeslot 360 that is not scheduled for transmission, reception or sharing. In this case the entire timeslot 360 is idle.

Figure 4:
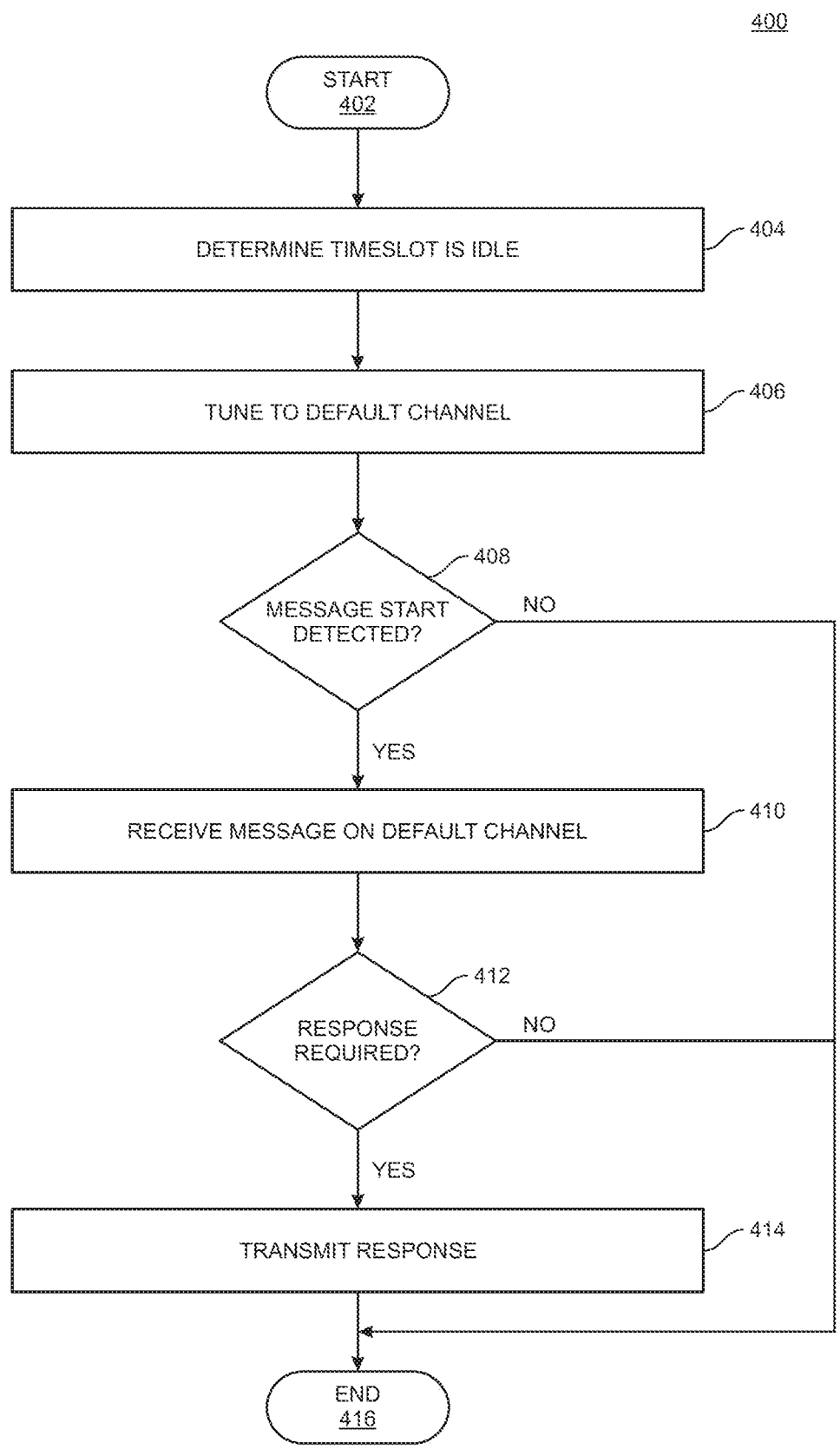
FIG. 4 depicts a flow diagram for a method of utilizing a default channel during unused periods of timeslots to receive unsynchronized message, according to one or more embodiments of the invention.

FIG. 4 depicts a flow diagram of a method 400 for utilizing a default channel during unused periods of timeslots to communicate with unsynchronized nodes, according to one or more embodiments of the invention. The method 400 starts at step 402 at the beginning of each timeslot and proceeds to step 404.

At step 404, a node determines that its timeslot is idle. A timeslot is idle if it is not assigned for reception (RX) or for transmission (TX). A timeslot is idle if it is assigned for transmission (TX) and there are no messages available in the transmission buffer for the node. A timeslot is idle if it is assigned for reception (RX) when no incoming frame is detected within a wait period 352 for a timeslot. A timeslot is idle if it is assigned as shared (SH) and there are no messages ready for transmission on the timeslot and when no incoming frame is detected within wait time for the timeslot. A timeslot is idle within the variable idle period 349 and 359 of FIGS. 3C and 3D, respectively when this period is long enough to switch to the default channel. At step 406, the idle node tunes to a default channel. The default channel is a well-known channel that other devices can use to transmit messages when communicating asynchronously with the network.

In step 408 it is determined whether a message is detected. The node listens for a start of message on the default channel until the end of the current timeslot. If no message is detected the method proceeds to step 416 and ends. However, if at step 408 it is determined that a start of message is detected the method proceeds to step 410.

At step 410, a message is received starting in the idle timeslot on the default channel.

At step 412, it is determined whether the message requires a response. The idle node verifies whether the message received is a valid type for an idle period. If the received message is invalid, the method proceeds to step 416 and ends. If the received message is valid but no response is required, the method proceeds to step 416 and ends. However, if at step 412 it is determined that the received message is valid and a response is required, the idle node schedules a transmission for the response and the method 400 proceeds to step 414. Scheduling of responses may be performed to avoid conflict with already scheduled TSCH activities and/or may be distributed randomly to avoid conflicts between multiple responders.

At step 414, the response is transmitted on the default channel. The default channel may be configured to be one of the TSCH hopping channel or it may not. When configured to be a non TSCH hopping channel, transmissions performed using the default channel will not interfere with normal TSCH traffic.

The method 400 ends at step 416.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A computer implemented method for a time slotted channel hopping system for utilizing a default channel during unused periods of timeslots to accept incoming messages, the time slotted channel hopping system including a plurality of network nodes including a plurality of connected network nodes connected to each other and at least one unconnected or unsynchronized network node that is not connected to or synchronized with the connected network nodes, the method comprising:
   determining when a timeslot is idle;
   in response to determining the timeslot is idle, tuning to a default channel while the timeslot is idle; and
   receiving a message on the default channel from the at least one unconnected or unsynchronized network node to connect to or synchronize with at least one network node of the plurality of connected network nodes,
   wherein the default channel is a known channel not part of a hopping list.

2. The method of claim 1, wherein the timeslot is idle when the timeslot is not assigned for reception or for transmission.

3. The method of claim 1, wherein the timeslot is idle when the timeslot is assigned for transmission and there are no messages available in a transmission buffer for a node.

4. The method of claim 1, wherein the timeslot is idle when the timeslot is assigned for transmission and there is sufficient time after the transmission and acknowledgement reception to change to the default channel and start listening before an end of the timeslot.

5. The method of claim 1, wherein the timeslot is idle when the timeslot is assigned for transmission on a transmission channel and a Clear Channel Assessment has determined that the transmission channel is available.

6. The method of claim 1, wherein the timeslot is idle when a timeslot is assigned for reception and no incoming message is detected within a wait time for a timeslot.

7. The method of claim 1, wherein the timeslot is idle when a timeslot is assigned for reception and the reception and transmission of an acknowledgement is complete and there is sufficient time to change to the default channel and start listening before an end of the timeslot.

8. The method of claim 1, wherein the timeslot is idle when a timeslot is assigned for reception and a reception of a non-valid message is detected.

9. The method of claim 1, wherein the timeslot is determined to be idle when the timeslot is assigned as shared and there are no messages ready for transmission on the timeslot and no incoming frame is detected within a wait time for the timeslot.

10. The method of claim 1, further comprising receiving a request for a beacon from a node wanting to join the network.

11. The method of claim 1, further comprising receiving a request from a handheld device to be used to initiate a local communication with a node.

12. The method of claim 1, further comprising receiving a request from battery powered or energy harvesting device to join or synchronize with the network.

13. The method of claim 12, further comprising receiving data from the battery powered or energy harvesting device.

14. The method of claim 1, further comprising:
receiving a beacon from a close by network; and
in response to receiving the beacon, triggering a network roaming activity to automatically distribute load between two or more networks.

15. The method of claim 1, wherein the message received on the default channel may start in a timeslot idle period but continue on past the start of a next timeslot.

16. A time slotted channel hopping system for utilizing a default channel during unused periods of timeslots to accept incoming messages, comprising:
a plurality of network nodes including a plurality of connected network nodes connected to each other and at least one unconnected or unsynchronized network node that is not connected to or not synchronized with the connected network nodes, each of the plurality of network nodes comprising:
a) at least one processor;
b) at least one input device; and
c) at least one storage device storing processor-executable instructions which, when executed by the at least one processor, perform a method including:
determining when a timeslot is idle;
in response to determining the timeslot is idle, tuning to a default channel while the timeslot is idle; and
receiving a message on the default channel from the at least one unconnected or unsynchronized network node to connect to or synchronize with at least one network node of the plurality of connected network nodes,
wherein the default channel is a known channel not part of a hopping list.

17. The system of claim 16, wherein the timeslot is idle when one of (i) the timeslot not assigned for reception or for transmission, (ii) the timeslot is assigned for transmission and there are no messages available in a transmission buffer for a node, (iii) the timeslot is assigned for transmission and there is sufficient time after the transmission and acknowledgement reception to change to the default channel and start listening before an end of the timeslot, (iv) the timeslot is assigned for transmission on a transmission channel and a Clear Channel Assessment has determined that the transmission channel is available, (v) a timeslot is assigned for reception and no incoming message is detected within a wait time for a timeslot, (vi) a timeslot is assigned for reception and the reception and transmission of the acknowledgement is complete and there is sufficient time to change to the default channel and start listening before an end of the timeslot, (vii) a timeslot is assigned for reception and a reception of a non-valid message is detected, or (viii) the timeslot is assigned as shared and there are no messages ready for transmission on the timeslot and no incoming frame is detected within a wait time for the timeslot.

18. The system of claim 16, wherein the message received on the default channel may start in a timeslot idle period but continue on past the start of a next timeslot.

* * * * *